Sept. 9, 1958 W. J. BOLEY 2,850,811
SYSTEM OF EXECUTING LETTERING
Filed Oct. 29, 1954 3 Sheets-Sheet 1
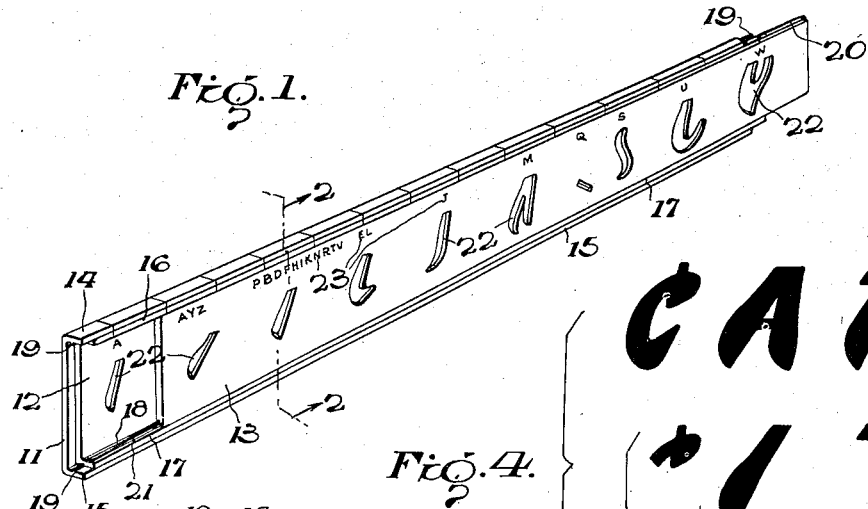
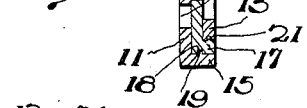
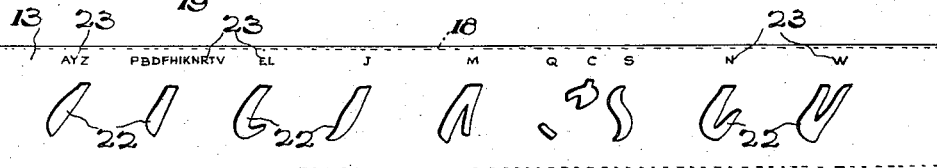
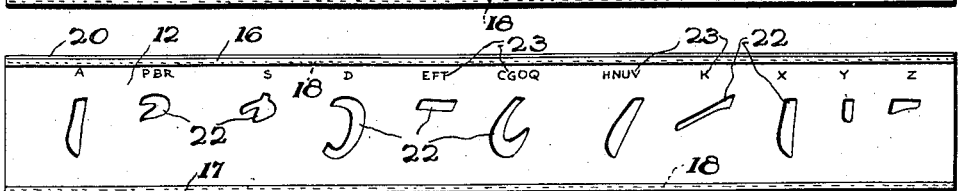
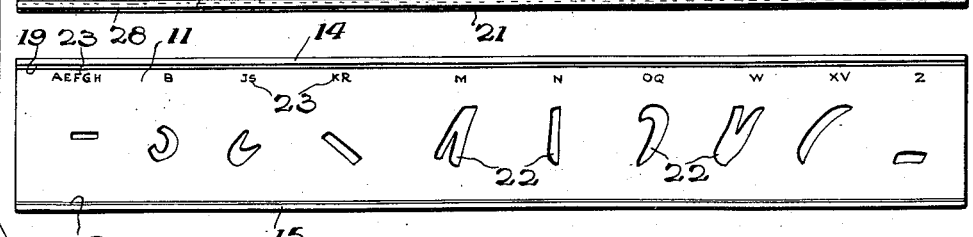
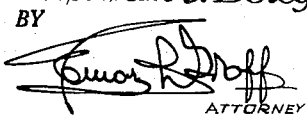
INVENTOR.
William J. Boley.
BY
ATTORNEY Sept. 9, 1958 W. J. BOLEY 2,850,811
SYSTEM OF EXECUTING LETTERING
Filed Oct. 29, 1954 3 Sheets-Sheet 2

INVENTOR.
William J. Boley.
BY
ATTORNEY

INVENTOR
William J. Boley.
BY
ATTORNEY

United States Patent Office 2,850,811
Patented Sept. 9, 1958

2,850,811

SYSTEM OF EXECUTING LETTERING

William J. Boley, Washington, D. C.

Application October 29, 1954, Serial No. 465,516

1 Claim. (Cl. 35—37)

This is a continuation-in-part of my copending application for patent, Serial No. 263,837, now abandoned, filed December 28, 1951.

This invention relates to the art of lettering, and is more particularly concerned with a method for facilitating the teaching of artistic lettering and penmanship, and means and devices for assisting a student or beginner in the formation of letters in a given style or font. The term "letters" as used here includes both letters of the alphabet and numerals.

Accordingly, the present invention is directed to an educational method and devices for executing the practical application of letters and figures to various articles, such as in the case of stencils.

In its primary aspect, the invention is the result of my discovery that it is possible to construct an alphabet and numerals of any given style from certain basic elements. That is to say, I have found, for example, that the letters of any given alphabet and numerals corresponding thereto are resolvable and reducible to certain basic component elements, and by using a series of these basic component elements, all letters of an alphabet and numerals can be constructed. This has an important advantage in teaching the art of lettering because it simplifies in modular terms the fundamental elements involved and furnishes a basic guide for the construction of the alphabet and numerals as a whole. Therefore, one of the objects of the invention is the provision of means for teaching the fundamental elements of letters of various alphabets and numerals corresponding thereto.

Another object of the invention is to provide a device for the purpose indicated which can also be used to apply lettering to various articles in lieu of ordinary stencils and in a manner which gives letters of continuous, rather than broken, lines or strokes. Ordinary stencils, as it is well-known, are formed by punching, cutting out, or otherwise perforating sheet material with configurations representing letters to be applied. For example, in the case of letters like A, B, D, O, P, Q and R and numerals like 4, 6, 9 and 0, the perforations cannot be continuous, but must be discontinuous to provide fins or bars to hold the parts together, otherwise the letters would not be properly represented. Such fins or bars result in such letters being formed of a broken construction which is sometimes objectionable. In accordance with the present invention, stencils can be prepared without the use of such fins or bars, thereby resulting in the application of letters of unbroken design.

A still further object of the invention is the provision of a neat, compact device in the form of a slide rule which can be carried about on the person and utilized for teaching lettering and also for applying letters to various articles, such as maps, drawings, signs, etc.

These and other objects and advantages of the invention will appear more fully from the following description considered together with the accompanying drawing in which:

Fig. 1 is a front perspective view of a slide rule embodying the features of one application of the invention.

Fig. 2 is a section along the line 2—2 of Fig. 1.

Fig. 3 is a front face view of the panels of the slide rule as they appear when separated.

Fig. 4 is a diagrammatic view illustrating the manner of constructing a word in accordance with the invention.

Figure 5:
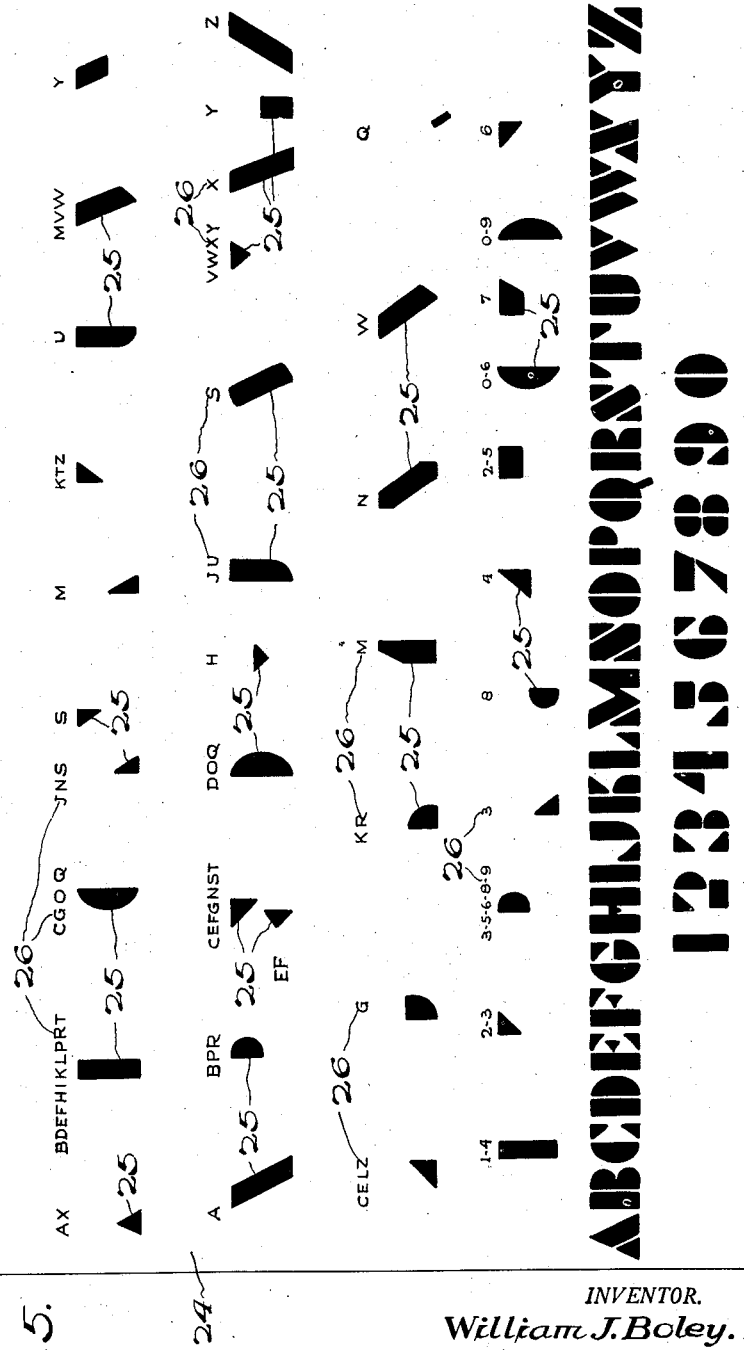
Fig. 5 is a face view of a chart embodying features of the invention in a different form and with respect to an alphabet and numerals of a different font.

Referring with more particularity to the drawing in which like numerals designate like parts, the embodiment illustrated in Figs. 1, 2, 3 and 4 comprises a form of slide rule containing a plurality of elongated panels in nested relation, three such panels being shown, namely rear panel 11, intermediate panel 12, and front panel 13.

The rear panel is in the form of a channel between the flanges 14 and 15 of which the intermediate panel 12 is disposed. The latter is also channel-shaped and its flanges 16 and 17 slidably abut, in the longitudinal direction, the inside of the flanges 14 and 15 respectively. The two panels are maintained in slidable nested relation by means of longitudinal grooves 18 in one of each abutting flange engaging projections 19. The front panel 13 fits within the intermediate panel 12 and is slidably nested therein by means of similar grooves 20 and projections 21. It is not necessary for the front panel 13 to be in the form of a channel or to carry flanges. The intermediate panel 12 may also be made in the same way, if desired, in which case both the intermediate and front panels would be in slidable engagement with the flanges of the rear panel. Alternatively, the intermediate panel may be in the form of a double channel or H-shaped to carry between the flanges on each side a panel of the type represented by the front panel 13.

The panels are preferably of a transparent or translucent material, such as Celluloid, Lucite, Plexiglas or other plastic composition. The panels contain perforations 22 outlining characters representing basic elements of an alphabet or numerals, or both, of a given font. These characters are arranged among the panels in such a way that any letter of the alphabet or numeral can be reproduced by positioning selected characters of two or more panels in relation to each other. These characters are determined by a comparative analysis of the letters of the alphabet and numerals. Adjacent or otherwise associated with each character, is a legend 23 indicating, for example, the letter or letters of the alphabet of which it constitutes an element. Hence, to form any desired letter, it is only necessary to bring in proper registry those elements which bear a legend containing the letter. For example, the letter F would be formed by the second element of panel 13, the fifth element of panel 12 and the first element of panel 11. In Fig. 4, there is illustrated how the word "cat" would be formed from seven of the elements.

To use the device in stenciling, each element is brought into proper relative position and reproduced separately, whereupon solid letters will result without discontinuous or broken lines or strokes.

The elements, instead of being formed in a plurality of panels, may be perforated, printed or otherwise applied on a single chart 24 as shown in Fig. 5, wherein the characters are designated by the numeral 25 and the legends by the numeral 26. Printed charts, although not useful for stenciling, may be used for giving group instruction and in making freehand studies.

Figure 6:
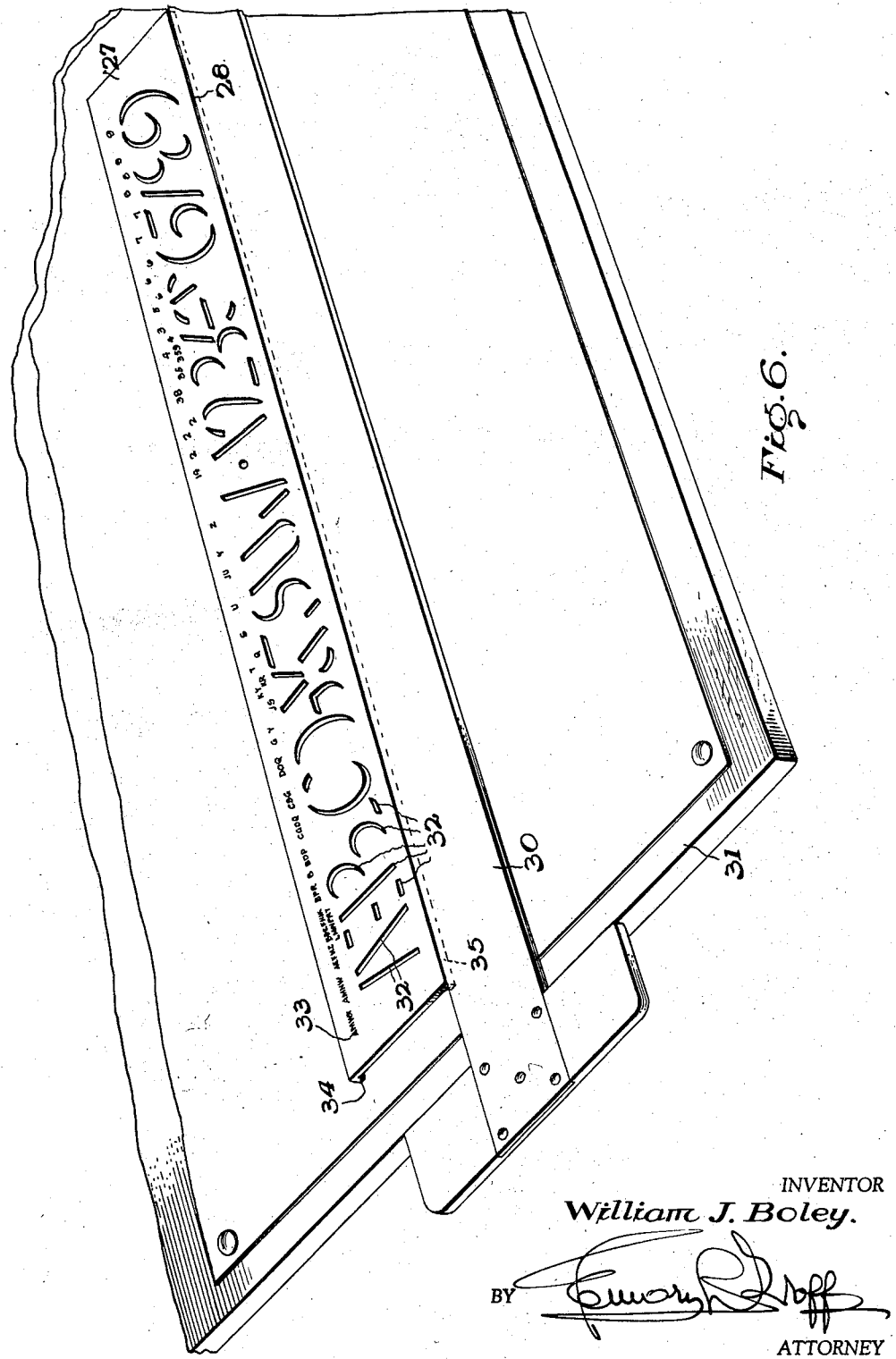
Fig. 6 is a perspective view of a modified form of the invention.

The modified form shown in Fig. 6 comprises an elongated one-piece strip 27 of Celluloid, Lucite, Plexiglas, wood, cardboard, or other material of suitable stiffness to form guiding edges for a writing implement. At least one longitudinal edge, preferably the bottom longitudinal edge 28 is in a straight line for guiding the strip along a straight edge, such as the upper edge 29 of a T-square 30 placed over a drawing board 31. The strip 27 contains cut out portions 32 each consisting of a different component of one or more characters of a given font of letters and numerals. The cut out portions collectively contain all the different components of the font and they are laterally spaced from the guide edge 28 and positioned relative to each other so that complementary portions of a given letter or numeral are in proper horizontal position for use in forming the letter or numeral merely by sliding the strip along the straight edge 29 and tracing the complementary portions in juxtaposition on a writing surface below. No lateral shifting of the strip 27 is necessary and the whole of each cut out portion is an exclusive and complete element of one or more characters. In this respect they differ from other lettering forms of the so-called "French curve" type where only a part of each cut-out portion is used at a time, making it necessary for the user to select the proper part of each cut-out portion to be used in any particular case. As in the previously described forms of the invention, the portions 32 are each associated with designations 33 indicating the character or characters of which it constitutes a portion or element.

The strip 27 is also provided with rearwardly projecting longitudinal runners 34 and 35 which slidably support the strip on the writing surface and hold the intermediate section thereof containing the cut out portions 32 offset above the plane of the writing surface. This permits rapid use of the device with ink, paint, or other writing fluids that may be used in forming the characters because it prevents smearing or smudging even when the writing fluid is still wet. For this purpose it is important that the space between the runners 34 and 35 be clear and devoid of anything which would contact and rub against the writing surface when the strip is slid along a line parallel to the runners.

I claim:

A device for use in manually forming characters and teaching the formation of characters comprising an elongated one-piece body, said body having an inverted U-shaped cross-section to provide a pair of spaced longitudinal runners for slidably and firmly supporting the device on a flat writing surface and a web section between said runners, said web section having a selected group of cut-off portions arranged longitudinally of the body, said portions being adapted as guide edges for a writing implement when the runners are in contact with a writing surface, each of said cut-out portions consisting exclusively of a different component part of at least one character and being disposed in a position between said runners corresponding to its position in the character in relation to other component parts of the same character represented by other of said cut-out portions, said portions collectively constituting all the component parts of a given set of characters, and legends carried by the body to identify each cut-out portion and to designate the complete character of which it is a component part.

References Cited in the file of this patent

UNITED STATES PATENTS

| | | |
|---|---|---|
| 187,420 | Schmitthenner | Feb. 13, 1877 |
| 217,736 | Kibbe | July 22, 1879 |
| 1,022,384 | Bahr | Apr. 2, 1912 |
| 1,145,512 | Reed | July 6, 1915 |
| 1,369,470 | Rian | Feb. 22, 1921 |
| 1,493,485 | Faust | May 13, 1924 |
| 1,574,953 | Wood | Mar. 2, 1926 |
| 1,593,892 | Wood | July 27, 1926 |
| 2,041,993 | Cousins | May 26, 1936 |
| 2,298,635 | Bliss | Oct. 13, 1942 |

FOREIGN PATENTS

| | | |
|---|---|---|
| 22,344 | Great Britain | Dec. 22, 1904 |
| 125,825 | Austria | Dec. 10, 1936 |